(12) United States Patent
Jung et al.

(10) Patent No.: US 8,305,550 B2
(45) Date of Patent: Nov. 6, 2012

(54) ELECTRICALLY-DRIVEN LIQUID CRYSTAL LENS AND STEREOSCOPIC DEVICE USING THE SAME

(75) Inventors: Sung Min Jung, Incheon-si (KR); Hee Jin Im, Anyang-si (KR)

(73) Assignee: LG Display Co., Ltd., Seoul (KR)

( * ) Notice: Subject to any disclaimer, the term of this patent is extended or adjusted under 35 U.S.C. 154(b) by 677 days.

(21) Appl. No.: 12/169,952

(22) Filed: Jul. 9, 2008

(65) Prior Publication Data
US 2009/0015737 A1 Jan. 15, 2009

(30) Foreign Application Priority Data

Jul. 11, 2007 (KR) .................. 10-2007-0069414
Oct. 22, 2007 (KR) .................. 10-2007-0106012

(51) Int. Cl.
*G02F 1/13* (2006.01)
*G02B 1/06* (2006.01)
(52) U.S. Cl. .................. 349/200; 349/15; 359/665
(58) Field of Classification Search .............. 349/15, 349/200; 359/665
See application file for complete search history.

(56) References Cited

U.S. PATENT DOCUMENTS

| | | | | |
|---|---|---|---|---|
| 4,572,616 A | * | 2/1986 | Kowel et al. .................. 349/200 |
| 4,795,238 A | * | 1/1989 | Iizuka et al. .................. 349/200 |
| 5,493,427 A | * | 2/1996 | Nomura et al. .................. 349/5 |
| 5,572,341 A | * | 11/1996 | Fergason .................. 349/200 |
| 2003/0063186 A1 | * | 4/2003 | Tomono .................. 348/51 |
| 2004/0189911 A1 | * | 9/2004 | Ohe et al. .................. 349/124 |
| 2007/0182915 A1 | * | 8/2007 | Osawa et al. .................. 349/201 |
| 2008/0002139 A1 | * | 1/2008 | Hashimoto .................. 349/187 |

FOREIGN PATENT DOCUMENTS

| | | |
|---|---|---|
| CN | 1231432 A | 10/1999 |
| CN | 1873482 A | 12/2006 |
| WO | WO200654803 A1 * | 5/2006 |

* cited by examiner

*Primary Examiner* — Michael Caley
(74) *Attorney, Agent, or Firm* — Birch, Stewart, Kolasch & Birch, LLP

(57) ABSTRACT

An electrically-driven liquid crystal lens, and a stereoscopic display device using the same, including first and second substrates arranged opposite each other and including an active region having a plurality of lens regions and a pad region defined at an outer rim of the active region, a plurality of first electrodes formed on the first substrate to correspond to the respective lens regions and spaced apart from one another, a second electrode formed on the entire surface of the second substrate, a voltage source to apply different voltages to the plurality of first electrodes, respectively, and to apply a ground voltage to the second electrode, and a liquid crystal layer interposed between the first substrate and the second substrate.

16 Claims, 14 Drawing Sheets

Lens Shape

Lens Shape

ELECTRICALLY-DRIVEN LIQUID CRYSTAL LENS AND STEREOSCOPIC DEVICE USING THE SAME

This application claims the benefit of the Korean Patent Application No. 2007-069414, filed on Jul. 11, 2007 and Korean Patent Application No. 2007-106012, filed on Oct. 22, 2007, which are hereby incorporated by reference in their entirety as if fully set forth herein.

BACKGROUND OF THE INVENTION

1. Field of the Invention

The present invention relates to a liquid crystal display device, and more particularly, to an electrically-driven liquid crystal lens, in which a lens, realized based on alignment of liquid crystals, can achieve a gentle parabolic lens surface via a change in electrode configuration, thereby being capable of reducing a cell gap of a liquid crystal layer and achieving a stable profile even when applied to large-area display devices, and a stereoscopic display device using the same.

2. Discussion of the Related Art

At present, services for rapid dissemination of information, constructed on the basis of high-speed information communication networks, have developed from a simple "listening and speaking" service, such as current telephones, to a "watching and listening" multimedia type service on the basis of digital terminals used for high-speed processing of characters, voice and images, and are expected to be ultimately developed into cyberspace 3-dimensional stereoscopic information communication services enabling virtual reality and stereoscopic viewing free from the restrains of time and space.

In general, stereoscopic images representing 3-dimensions are realized based on the principle of stereo-vision via the viewer's eyes. However, since the viewer's eyes are spaced apart from each other by about 65 mm, i.e. have a binocular parallax, the left and right eyes perceive slightly different images due to a positional difference therebetween. Such a difference between images due to the positional difference of the eyes is called binocular disparity. A 3-dimensional stereoscopic image display device is designed on the basis of binocular disparity, allowing the left eye to view only an image for the left eye and the right eye to view only an image for the right eye.

Specifically, the left and right eyes view different two-dimensional images, respectively. If the two different images are transmitted to the brain through the retina, the brain accurately fuses the images, giving the impression of a real 3-dimensional image. This ability is conventionally called stereography, and a display device utilizing stereography is called a stereoscopic display device.

Meanwhile, stereoscopic display devices can be classified according to constituent components of a lens provided to reproduce a 3-dimensional image. For example, a lens, constructed using a liquid crystal layer, is called a liquid crystal lens, which is driven by an electric field. Hereinafter, this kind of lens will be referred to as an electrically-driven liquid crystal lens.

Conventionally, a liquid crystal display device includes two electrodes opposite each other, and a liquid crystal layer formed between the two electrodes. Liquid crystal molecules of the liquid crystal layer are driven by an electric field generated when a voltage is applied to the two electrodes. The liquid crystal molecules have polarization and optical anisotropy properties. Here, according to the polarization property, when a liquid crystal molecule is placed within an electric field, electric charges in the liquid crystal molecule are gathered to opposite sides of the liquid crystal molecule, whereby a molecular arrangement direction is altered according to an applied electric field. The optical anisotropy property is that, owing to an elongated configuration of liquid crystal molecules and the above-described molecular arrangement direction, the path of light to be emitted or polarization conditions of the emitted light is changed according to the incidence direction of incident light or polarization conditions of the incident light.

Accordingly, the liquid crystal layer possesses a difference of transmissivity by voltages applied to the two electrodes, and an image can be displayed using the transmissivity difference of pixels.

Recently, there has been developed an electrically-driven liquid crystal lens in which a liquid crystal layer serves as a lens using the above-described properties of liquid crystal molecules.

Specifically, a lens controls the path of incident light according to a given position using a difference between an index of refraction of a lens constituent material and an index of refraction of air. If different voltages are applied to different positions of the electrodes to drive the liquid crystal layer by different electric fields, the incident light introduced into the liquid crystal layer causes different phase variations at different positions, and as a result, the liquid crystal layer can control the path of incident light in the same manner as an actual lens.

Hereinafter, a conventional electrically-driven liquid crystal lens will be described with reference to the accompanying drawings.

FIG. 1 is a sectional view illustrating a conventional electrically-driven liquid crystal lens, and FIG. 2 is a graph illustrating electric potential distribution upon formation of the electrically-driven liquid crystal lens shown in FIG. 1 after voltages are applied to the liquid crystal lens.

As shown in FIG. 1, the conventional electrically-driven liquid crystal lens includes first and second substrates 10 and 20 arranged opposite each other, and a liquid crystal layer 30 formed between the first substrate 10 and the second substrate 20.

Here, first electrodes 11 are formed on the first substrate 10 such that they are spaced apart from one another by a first interval. In these neighboring first electrodes 11, a distance from the center of one of the first electrodes 11 to the center of the next first electrode 11 is called pitch. Repeating the same pitch for each of the first electrodes results in a pattern.

A second electrode 21 is formed on the entire surface of the second substrate 20 opposite the first substrate 10.

The first and second electrodes 11 and 21 are made of transparent metals. The liquid crystal layer 30 is formed in a space between the first electrodes 11 and the second electrode 21. Liquid crystal molecules constituting the liquid crystal layer 30 have a property of responding to the strength and distribution of an electric field, and thus, have a phase distribution similar to the electrically-driven liquid crystal lens as shown in FIG. 2.

The above-described electrically-driven liquid crystal lens is obtained under the condition of applying a high voltage to the first electrode 11 and grounding the second electrode 21. Under these voltage conditions, a vertical electric field is strongest at the center of the first electrode 11, and the strength of the vertical electric field decreases away from the first electrode 11. Thereby, when the liquid crystal molecules constituting the liquid crystal layer 30 have a positive dielectric constant anisotropy, the liquid crystal molecules are arranged according to the electric field in such a way that they are upright at the center of the first electrode 11 and tilt closer to a horizontal plane with increasing distance from the first electrode 11. As a result, in view of light transmission, an optical path is shortened at the center of the first electrode 11, and is lengthened with increasing distance from the first electrode 11, as shown in FIG. 2. Representing the length variation of the optical path using a phase plane, the electrically-driven liquid crystal lens has light transmission effects similar to a parabolic lens having a parabolic lens surface.

Here, the second electrode 21 causes behavior of an electrically-driven liquid crystal lens, whereby an index of refraction thereof generally takes the form of a spatial parabolic function, and the first electrodes 11 are arranged to define edge regions of the lens.

In this case, a relatively higher voltage is applied to the first electrodes 11 than the second electrode 21. Therefore, as shown in FIG. 2, an electric potential difference occurs between the first electrodes 11 and the second electrode 21. In particular, a steep side electric field is generated around the first electrodes 11. As a result, since liquid crystal molecules cannot achieve a gentle distribution and have a slightly distorted distribution, the conventional electrically-driven liquid crystal lens has characteristics in that an index of refraction of the liquid crystal molecules cannot achieve parabolic spatial distribution or movement of the liquid crystal molecules is excessively sensitive to voltage variation.

The above-described conventional electrically-driven liquid crystal lens can be manufactured by forming electrodes on both substrates, respectively, with liquid crystals interposed therebetween and applying voltages to the electrodes, without using a lens having a physically formed parabolic lens surface.

However, a liquid crystal display device using the above-described electrically-driven liquid crystal lens has the following problems.

Firstly, since electrodes formed on a lower substrate occupy an extremely partial area of a lens region, a steep side electric field, rather than a gentle electric field, is generated between a lens edge region corresponding to the electrodes and a lens center region. The steep side electric field results in a slightly distorted phase of the electrically-driven liquid crystal lens. In particular, in the electrically-driven liquid crystal lens formed by a liquid crystal electric field, as the pitch of the lens region is increased, the number of electrodes, to which a high voltage is applied, is limited. Therefore, the lens region has an insufficient electric field between the electrodes, to which a high voltage is applied, and an upper substrate opposite the electrodes. As a result, formation of the electrically-driven liquid crystal lens having a gentle parabolic lens surface suitable to achieve the same optical effects as an actual lens is extremely difficult.

Secondly, in the case of a large-area display device, the lens center region, which is distant from the lens edge region where the electrodes, to which a high-voltage is applied, are located, is essentially unaffected by an electric field, complicating alignment control of liquid crystals using the electric field and resulting in a serious distortion in lens shape based on the electric field. As occasion demands, when control in the lens center region is difficult or impossible, the resulting electrically-driven liquid crystal lens has a discontinuous lens profile, which makes the electrically-driven liquid crystal lens ineffective as a lens.

Thirdly, the electrically-driven liquid crystal lens, constructed by a vertical electric field between the electrodes to which a single high voltage is applied and an electrode formed on the entire surface of the substrate opposite to the electrodes to which the high voltage is applied, sags. Therefore, the electrically-driven liquid crystal lens must have upper and lower margins, and requires an enormous amount of liquid crystals. There exists an urgent need to remedy this problem.

SUMMARY OF THE INVENTION

Accordingly, the present invention is directed to an electrically-driven liquid crystal lens and a stereoscopic display device using the same that substantially obviate one or more problems due to limitations and disadvantages of the related art.

An object of the present invention is to provide an electrically-driven liquid crystal lens, in which a lens, realized based on alignment of liquid crystals, can achieve a gentle parabolic lens surface via a change in electrode configuration, thereby being capable of reducing a cell gap of a liquid crystal layer and achieving a stable profile even when applied to large-area display devices, and a stereoscopic display device using the same.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an electrically-driven liquid crystal lens comprises: first and second substrates arranged opposite each other and including an active region having a plurality of lens regions and a pad region defined at an outer rim of the active region; a plurality of first electrodes formed on the first substrate to correspond to the respective lens regions and spaced apart from one another; a second electrode formed on the entire surface of the second substrate; a voltage source to apply different voltages to the plurality of first electrodes, respectively, and to apply a ground voltage to the second electrode; and a liquid crystal layer interposed between the first substrate and the second substrate.

The plurality of first electrodes may be formed on the same layer over the first substrate. As occasion demands, at least one insulating film may be further formed on the first substrate. In this case, the plurality of first electrodes may be formed on the first substrate and on the insulating film such that they are horizontally symmetrical in each lens region of the first substrate. The plurality of first electrodes on the insulating film may be positioned to correspond to locations on the first substrate where no first electrode is formed.

The voltage source may include a distribution voltage generator, which distributes minimum and maximum voltages applied thereto into a plurality of different voltages between the minimum voltage and the maximum voltage, so as to apply different voltages to the respective first electrodes.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to an electrically-driven liquid crystal lens and a stereoscopic display device using the same according to the preferred embodiments of the present invention, examples of which are illustrated in the accompanying drawings. Wherever possible, the same reference numbers will be used throughout the drawings to refer to the same or like parts.

Figure 1:
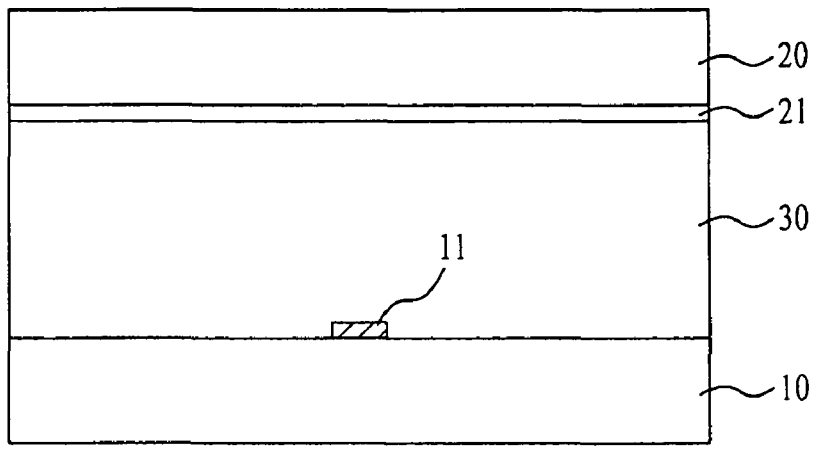
FIG. 1 is a sectional view illustrating a conventional electrically-driven liquid crystal lens.
Figure 2:
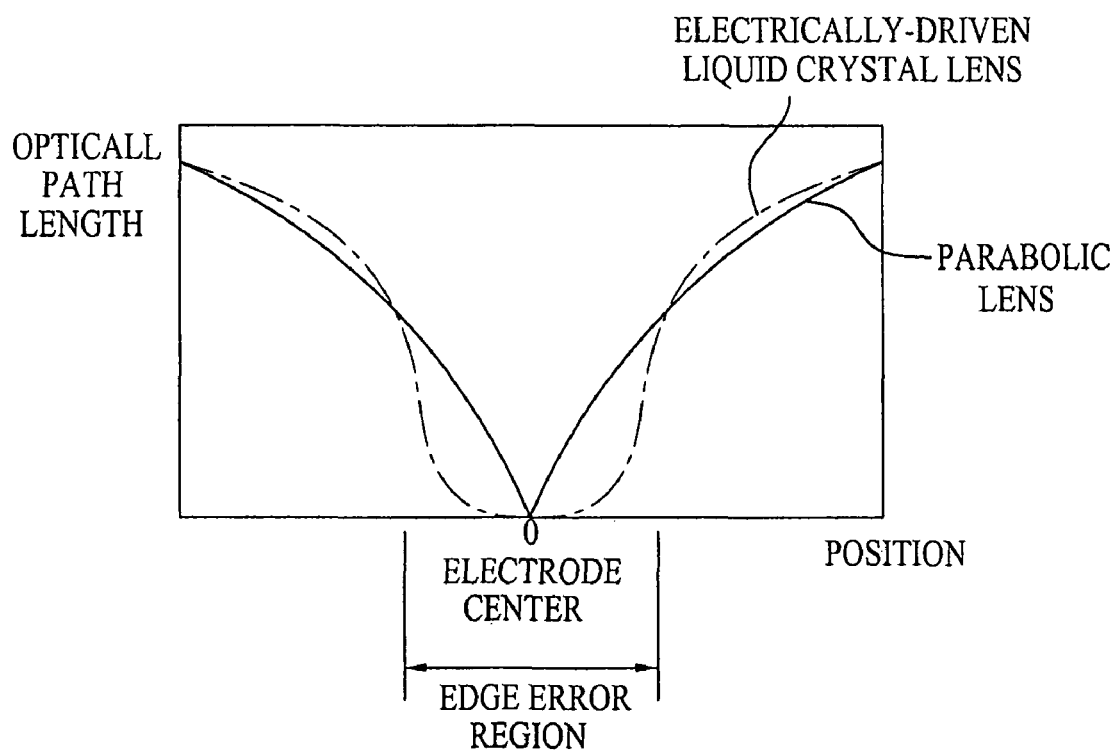
FIG. 2 is a graph illustrating an optical path (phase variation) according to a given position of the electrically-driven liquid crystal lens shown in FIG. 1.
Figure 3:
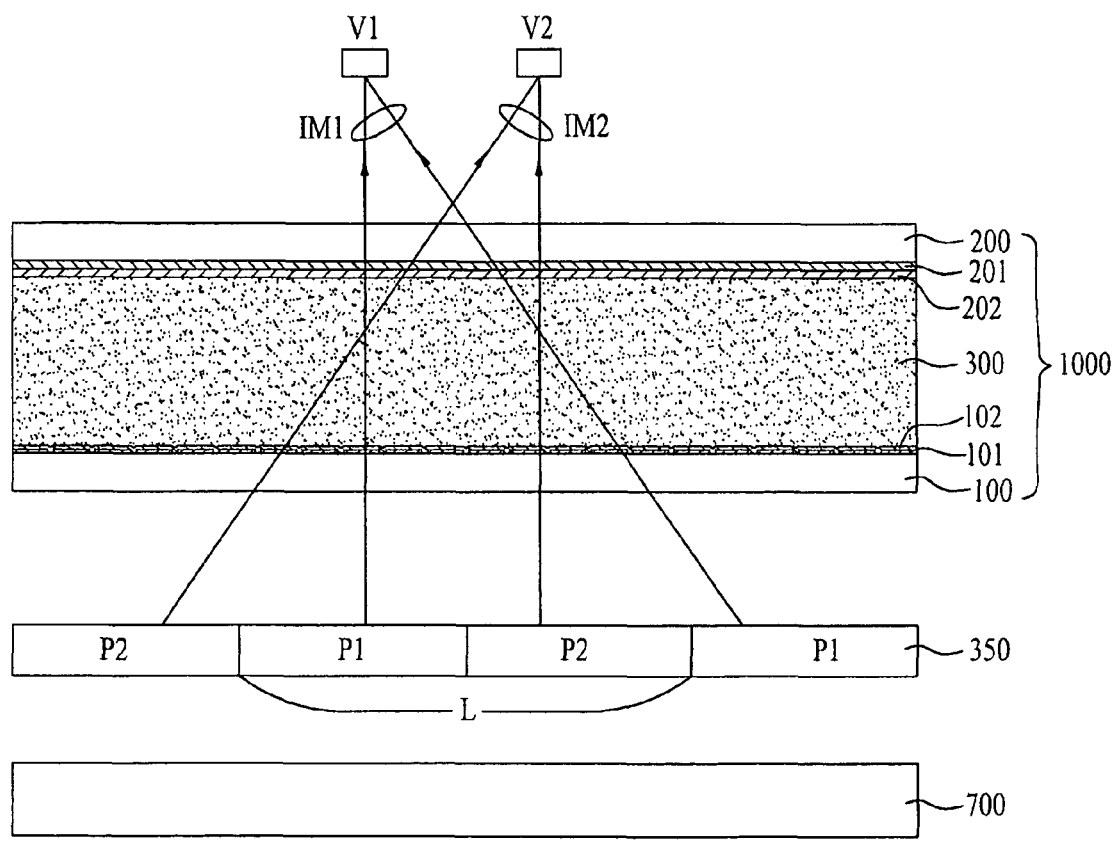
FIG. 3 is a sectional view illustrating a stereoscopic display device using an electrically-driven liquid crystal lens according to a first embodiment of the present invention.
Figure 4:
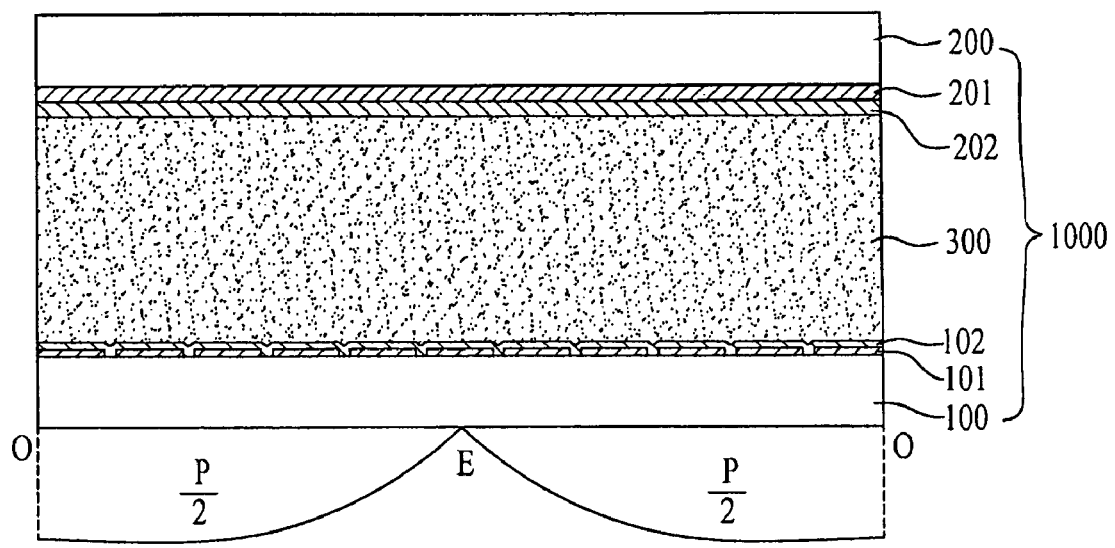
FIG. 4 is a sectional view illustrating the electrically-driven liquid crystal lens of FIG. 3.

FIG. 3 is a sectional view illustrating a stereoscopic display device using an electrically-driven liquid crystal lens according to a first embodiment of the present invention, and FIG. 4 is a sectional view illustrating the electrically-driven liquid crystal lens of FIG. 3.

As shown in FIG. 3, the stereoscopic display device, having an electrically-driven liquid crystal lens according to the first embodiment of the present invention, includes an electrically-driven liquid crystal lens 1000, which is driven via application of voltages and functions as a lens, a display panel 350, which is disposed below the electrically-driven liquid crystal lens 1000 and serves to emit 2-dimensional image information, and a light source 700, which is disposed below the display panel 350 and serves to emit light to the display panel 350.

As occasion demands, if the display panel 350 is a self-illuminating device, the light source 700 can be omitted.

First and second image pixels P1 and P2, which serve to display first and second images IM1 and IM2, respectively, are alternately and repeatedly arranged on the display panel 350. The display panel 350 can be selected from various flat-panel displays including a Liquid Crystal Display (LCD), Organic Light Emitting Display (OLED), Plasma Display Panel (PDP), Field Emission Display (FED), etc. The display panel 350 is located below the electrically-driven liquid crystal lens 1000, and serves to transmit a two-dimensional image signal to the electrically-driven liquid crystal lens 1000.

The electrically-driven liquid crystal lens 1000 according to the present invention functions to convert the two-dimensional image signal into a 3-dimensional image signal according to the profile of a lens surface to thereby emit the 3-dimensional image signal. The electrically-driven liquid crystal lens 1000 is located above the display panel 350, and functions to selectively emit the 3-dimensional image signal or the 2-dimensional image signal without conversion, according to whether or not voltages are applied thereto. Specifically, the electrically-driven liquid crystal lens 1000 can achieve a switching function such that it can display a 2-dimensional image on the basis of light transmission characteristics when no voltage is applied to the electrically-driven liquid crystal lens 1000 and also, can display a 3-dimensional image when voltages are applied to the electrically-driven liquid crystal lens 1000.

Hereinafter, the electrically-driven liquid crystal lens 1000 will be described in detail.

As shown in FIGS. 3 and 4, the electrically-driven liquid crystal lens 1000 according to the first embodiment of the present invention includes first and second substrates 100 and 200 which are arranged opposite each other and have a plurality of lens regions corresponding to each other, a plurality of first electrodes 101 which are formed on the first substrate 100 such that they are spaced apart from one another within each lens region, a second electrode 201 which is formed on the entire surface of the second substrate 200, voltage signal output terminals Vmin, V1, V2, . . . Vmax which apply different voltages to the respective first electrodes 101, and a liquid crystal layer 300 filled between the first substrate 100 and the second substrate 200.

The first and second electrodes 101 and 201 are made of transparent metals such as Indium Tin Oxide (ITO) and Indium Zinc Oxide (IZO), and prevent loss of transmissivity at locations of the respective electrodes.

With respect to each lens region L, a first voltage Vmin, which is approximately equal to an approximate threshold voltage Vth, is applied to the center O of the lens region L, and the highest $n^{th}$ voltage Vmax is applied to the first electrodes 101 located at the edge E of the lens region L. In this case, voltages to be applied to the first electrodes 101, located between the center O and the edge E of the lens region L, have different values between the first voltage Vmin, equal to the threshold voltage of the lens region L, and the $n^{th}$ voltage Vmax, and are gradually increased with increasing distance from the center O of the lens region L. Meanwhile, once different voltages are applied to the plurality of first electrodes 101, a ground voltage is applied to the second electrode 201, to generate a vertical electric field between the first electrodes 101 and the second electrode 201.

The plurality of first electrodes 101 in the lens regions L are horizontally symmetrical about the edges E of the lens regions L. The first electrodes 101 are connected to corresponding voltage signal output terminals Vmin, V1, V2, V3, . . . Vmax via metal wirings 110 located in pad regions (corresponding to a non-display region of the display panel 350), so as to receive different voltages applied from the corresponding voltage signal output terminals.

Here, the first voltage Vmin, which is equal to the lowest threshold voltage to be applied to the first electrode 101 formed at a position corresponding to the center O of the lens region L, is an AC square wave voltage having a peak value of about 1.4V to 2V. The threshold voltage Vmin is given by $$V = \pi \sqrt{\frac{K1}{\Delta \varepsilon \varepsilon 0}}$$

(where, $\Delta \in$ is a liquid crystal dielectric constant anisotropy, K1 is the modulus of elasticity of a liquid crystal layer, and $\in_o$ is a free-space dielectric constant). Also, of the different voltages to be applied to the first electrodes 101, the highest voltage corresponding to the edge E of the lens region L is an AC square wave voltage having a peak value of about 2.5 to 10V.

Meanwhile, in the case where the different voltages between the above-described threshold voltage (i.e. AC square wave voltage having a peak value of 1.4V to 2V) and the highest voltage (i.e. AC square wave voltage having a peak value of 2.5V to 10V) are applied to the plurality of first electrodes 101 provided in the electrically-driven liquid crystal lens 1000 and a ground voltage is applied to the second electrode 201, the electrically-driven liquid crystal lens 1000 substantially functions as an optical lens having a parabolic lens surface. Also, the first and second images IM1 and IM2 emitted from the display panel 350 are transmitted to first and second viewing zones V1 and V2, respectively, by the electrically-driven liquid crystal lens 1000. When a distance between the first viewing zone V1 and the second viewing zone V2 is set to a distance between the viewer's eyes, the viewer can recognize a 3-dimensional image based on a binocular disparity by combining the first and second images IM1 and IM2 transmitted to the first and second viewing zones V1 and V2.

When no voltage is applied to the first electrodes 101 and the second electrode 201, the electrically-driven liquid crystal lens 1000 simply serves as a transparent layer to directly display the first and second images IM1 and IM2 of the display panel 350 without refraction. Accordingly, the first and second images IM1 and IM2 are directly transmitted to the viewer without discrimination of viewing zones, and the viewer perceives 2-dimensional images.

In the drawings, one lens region L of the electrically-driven liquid crystal lens 1000 is configured to have the same width as a total width of two pixels P1 and P2 of the display panel 350 located below the electrically-driven liquid crystal lens 1000. As occasion demands, a plurality of pixels may correspond to one lens region L, the lens regions L may be tilted at a predetermined angle with respect to the pixels, or the lens regions L may be arranged stepwise with respect to the pixels (more particularly, the lens region of an $n^{th}$ pixel horizontal line is shifted from an $(n+1)^{th}$ pixel horizontal line by a predetermined distance).

The respective lens regions L are defined to have a width corresponding to one pitch. The lens regions L with the same pitch are periodically repeated in a given direction (for example, in a horizontal direction as shown in FIG. 4). In this case, one pitch P means a horizontal width of a single lens region L, and the lens region L represents a region functioning as a single lens which is realized via alignment of liquid crystals according to application of an electric field, rather than having the profile of a physically formed lens such as the shown convex lens. In FIG. 4, a distance between the center O and the edge E of the lens region L is equal to a value of P/2. This means that symmetrical values of voltages are applied to the symmetrical first electrodes 101 between the center O and the edge E of the lens region L.

A first alignment film 102 and a second alignment film 202 are formed, respectively, on the first substrate 100 including the first electrodes 101 and on the second electrode 201. In this case, to allow the electrically-driven liquid crystal lens 1000 to function as a transparent layer in an initial state when no voltage is applied, the first alignment film 102 has the same rubbing direction as the first electrodes 101, and the second alignment film 202 has a rubbing direction intersecting that of the first alignment film 201. Thereby, the electrically-driven liquid crystal lens 1000 can directly pass images, transmitted upward via the display panel 350, to the viewer.

The above-described lens regions L are obtained by repeating the configuration as shown in FIG. 4 in a horizontal direction by an interval equal to the pitch P.

The plurality of first electrodes 101 have a bar shape extending along a crosswise direction of the first substrate 100 (in the direction into the drawing). The single first electrode 101 has a width of 2 μm to 10 μm, and a distance between the neighboring first electrodes 101 is in a range of 2 μm to 10 μm. For example, the pitch of the lens region L can be changed to various values from 90 μm to 1,000 μm. Accordingly, according to the width and spacing distance of the above-described first electrodes 101, ten to one hundred or more first electrodes can be formed per lens region. In this case, it is preferred that the width and spacing distance of the first electrodes 101 have uniform values. For example, the width and spacing distance of the first electrodes 101 have the same values within the above described numerical range of 2 μm to 10 μm.

Outer rim region (non-display region including pad regions) of the first and second substrates 100 and 200 is provided with a seal pattern, to support both the first and second substrates 100 and 200. The liquid crystal layer 300 between the first substrate 100 and the second substrate 200 must have a sufficient thickness equal to approximately 15 μm more for formation of a sufficient phase of the electrically-driven liquid crystal lens. To stably maintain the thickness of the liquid crystal layer 300, ball spacers or column spacers can be further formed to support a cell gap between the first substrate 100 and the second substrate 200. In this case, it is advantageous to position the spacers so as not to distort the phase of the electrically-driven liquid crystal lens.

Figure 5:
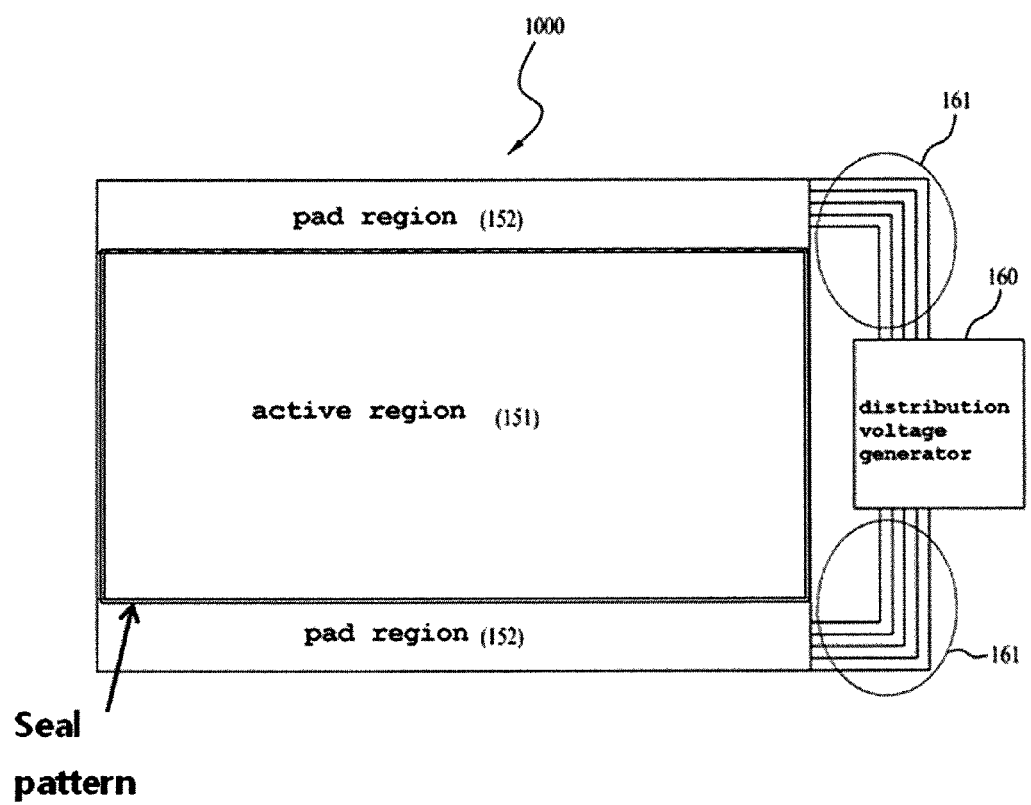
FIG. 5 is a schematic view illustrating the electrically-driven liquid crystal lens and a voltage application part thereof.
Figure 6:
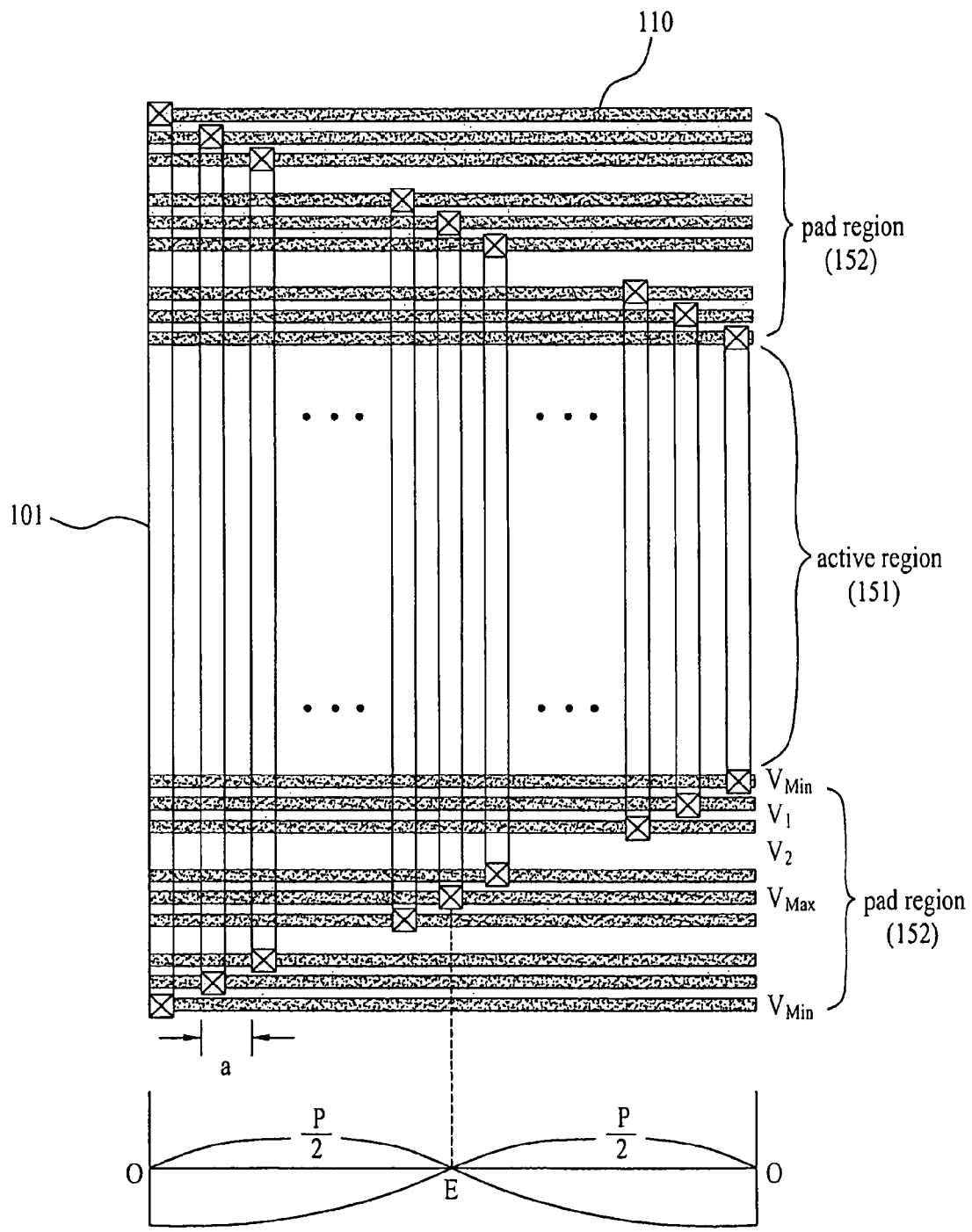
FIG. 6 is a plan view illustrating the electrically-driven liquid crystal lens according to the present invention.

FIG. 5 is a schematic view illustrating the electrically-driven liquid crystal lens and a voltage application part thereof, and FIG. 6 is a plan view illustrating the electrically-driven liquid crystal lens according to the present invention.

As shown in FIGS. 5 and 6, the electrically-driven liquid crystal lens includes an active region 151 as a display region, and pad regions 152 to apply and transmit voltage signals to the first electrodes 101 and the second electrode 201 formed in the active region 151.

Each of the pad regions 152 includes a voltage source to apply voltage signals from an external station. The voltage source includes a distribution voltage generator 160 (See FIG. 8) to generate voltages to be applied to divided electrodes, and links 161 to connect the distribution voltage generator 160 to the pad regions 152. Here, the voltage source applies different voltages to the plurality of first electrodes 101 (See FIGS. 3 and 4) and also, applies a ground voltage to the second electrode 201 (See FIGS. 3 and 4). To apply different voltages to the plurality of first electrodes 101, the distribution voltage generator 160 of the voltage source includes resistors between respective voltage signal output terminals for the minimum and maximum voltages Vmin and Vmax and the other different voltages therebetween, and buffers provided at the respective voltage signal output terminals. In this case, magnitudes of resistances to be outputted between the respective voltage signal output terminals for the minimum and maximum voltages Vmin and Vmax and the respective voltages therebetween can be adjusted according to magnitudes of the voltages to be distributed. The voltages to be applied to the respective first electrodes 101 are gradually increased from the edge E to the center O of the lens region L. These voltages can be adjusted according to the magnitudes of resistances.

Here, ends of each first electrode 101 come into contact with the metal wirings 110, to which a total of n voltage signals from the first voltage Vmin to the $n^{th}$ voltage Vmax are applied.

And, the spacing distance ("a") of the first electrodes 101 have the same values within the above described numerical range of 2 μm to 10 μm.

FIG. 6 illustrates a state wherein the metal wirings 110 are located on the pad regions above and below the active region and 2n−1 metal wirings are formed in the upper and lower pad regions. More specifically, in a state wherein a total of n metal wirings 110 are provided between the edge E of the lens region L shown at the center of the drawing and the center O of the lens region shown at the left side of the drawing, the first voltage Vmin is applied to the lowermost metal wiring. As the voltage signals are gradually increased toward the edge E of the lens region L with increasing distance from the center O of the lens region L, the $n^{th}$ voltage Vmax is applied to the $n^{th}$ metal wiring 110. Similarly, in a state wherein a total of n metal wirings 110 are provided between the center O of the lens region L shown at the right side of the drawing and the edge E of the lens region L shown at the center of the drawing, the respective voltage signals from the first voltage Vmin to the $n^{th}$ voltage Vmax are applied in sequence starting from the uppermost metal wiring 110. In this case, on the basis of the edge E of the lens region L and on the basis of the first electrode 101 corresponding to the edge E and the metal wiring 110 coming into contact with the first electrode 101, symmetrical voltage signals decreasing from the $n^{th}$ voltage Vmax to the first voltage Vmin are applied to the upper and lower metal wirings 110. As the respective first electrodes 101 come into contact with the above-described metal wirings 110 in sequence, voltage signals gradually decreasing from the edge E to the center O of the lens region L are applied to the first electrodes 101. In this case, the first electrodes 101 and the metal wirings 110 come into contact with each other via contact holes formed in a protective layer (not shown) which is interposed between the first electrodes 101 and the metal wirings 110.

The plurality of first electrodes 101 are arranged such that they have the same width and the same spacing distance within the lens region L. Also, the first electrodes 101 are formed on the same layer of the first substrate 100. FIGS. 3 and 4 illustrate a state wherein the first electrodes 101 are directly formed on a surface of the first substrate 100.

Figure 7A:
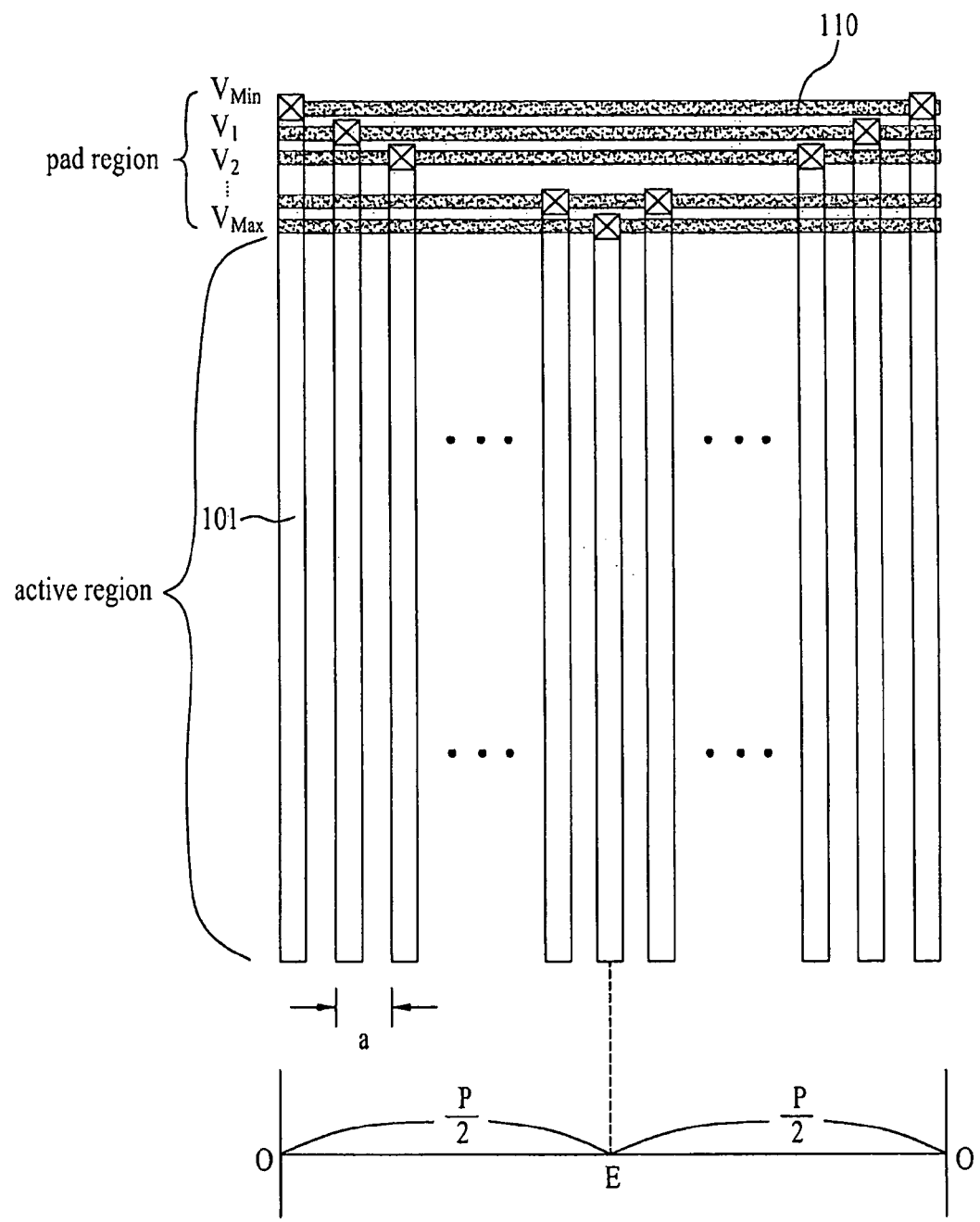
FIGS. 7A and 7B are plan views illustrating different alternative embodiments of the electrically-driven liquid crystal lens according to the present invention.
Figure 7B:
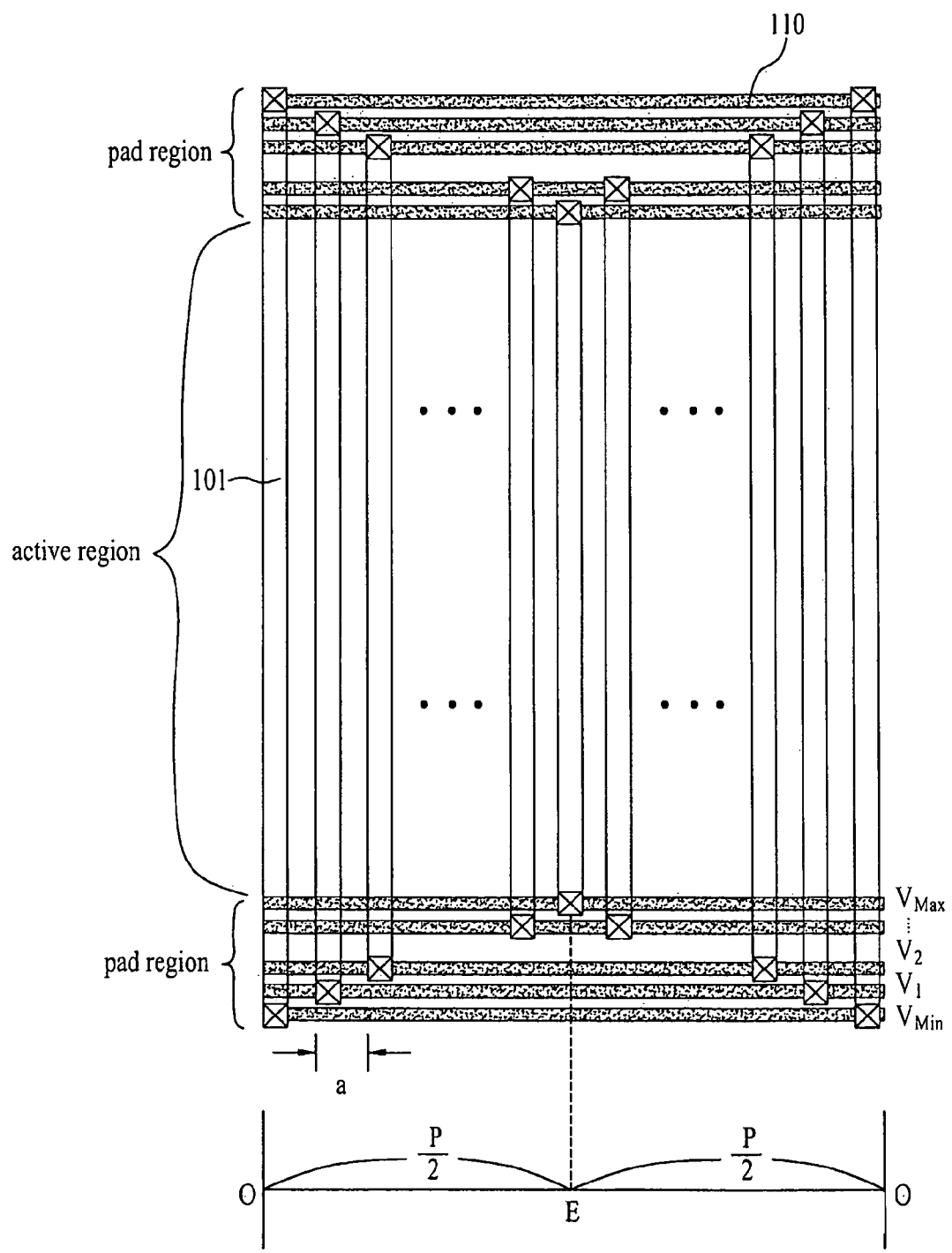

FIGS. 7A and 7B are plan views illustrating different alternative embodiments of the electrically-driven liquid crystal lens according to the present invention.

FIG. 7A is a plan view of the electrically-driven liquid crystal lens according to another alternative embodiment of the present invention. As compared to FIG. 6, the electrically-driven liquid crystal lens of the present embodiment does not include symmetrical upper and lower pad regions, and includes a single pad region including n metal wirings 110 only above the active region. This configuration minimizes a formation area and contact area of the metal wirings 110, and results in an increased active region. In this case, a total of n voltage signals from the first voltage Vmin to the $n^{th}$ voltage Vmax are applied to the n metal wirings 101, respectively, and a total of (2n−1) first electrodes 101 are provided between opposite edges of a single lens region (the edge E of the lens region L is shown at the center of the drawing and the center O of the lens region L is shown the left side or right side of the drawing). Except for the metal wiring 110 to which the $n^{th}$ voltage Vmax is applied, the remaining metal wirings 110, to which voltage signals from the first voltage Vmin to the $n-1^{th}$ voltage Vmax-1 are applied, have two left and right contacts horizontally symmetrical about the first electrode 101, respectively.

The above-described configuration except for the adoption of the single pad region is identical to the above-described configuration of FIG. 6 and thus, a description of the same configuration will be omitted.

As compared to FIG. 7A, FIG. 7B illustrates pad regions, which are provided above and below the active region and each includes a total of n metal wirings 110. The configuration of FIG. 7B is identical to that of FIG. 7A except for using both the upper and lower pad regions rather than the single pad region provided only at one side of the active region and thus, a description of the same configuration will be omitted.

Considering functions of FIGS. 6, 7A and 7B, the pad region(s) is provided to apply different voltage signals to the plurality of first electrodes. With the configurations, as shown in FIGS. 6 and 7B, in which the pad regions are symmetrically provided at upper and lower ends of the active region, when voltage signals are applied to only one pad region, it is possible to prevent the problem of a voltage drop and consequently, to reduce the likelihood of defects. Also, the configuration, as shown in FIG. 7A, in which the pad region is provided at only one side, is suitable for use in small-scale models, etc., and is free from the problem of a voltage drop by virtue of a short length of the electrodes, and can be mainly used without loss of opening ratio.

Figure 8:
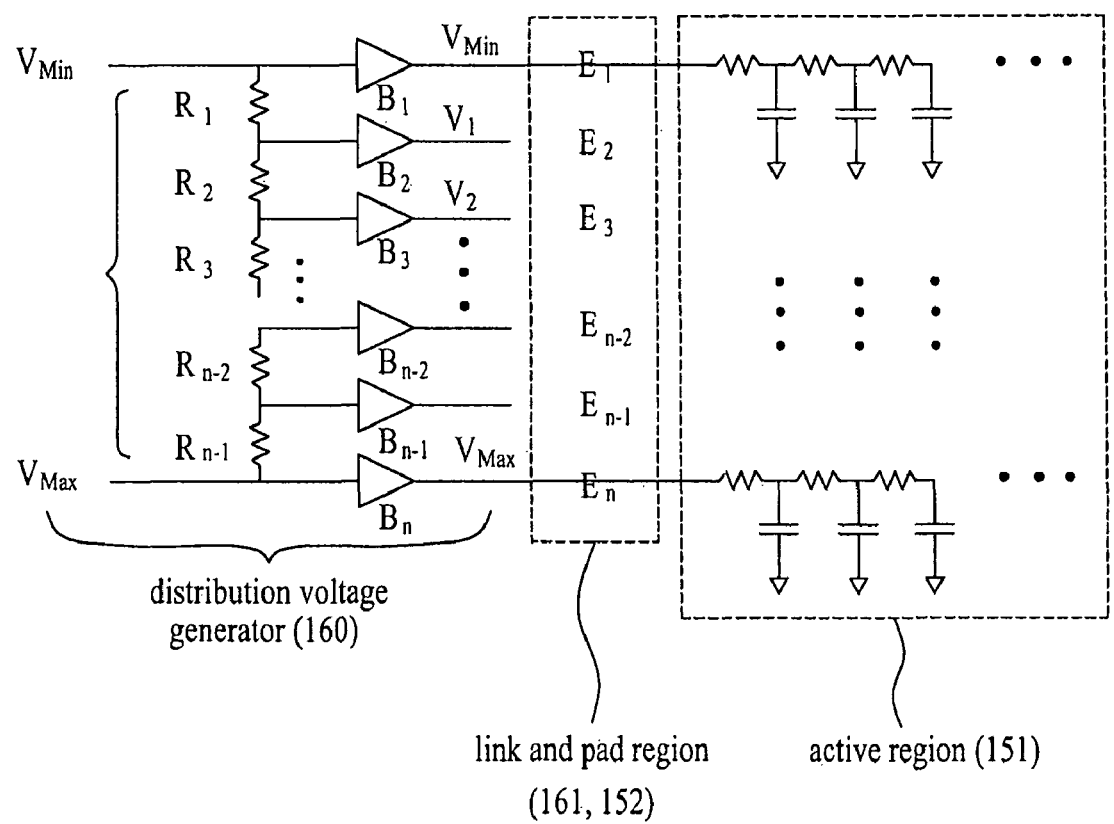
FIG. 8 is a block diagram illustrating a voltage application manner according to the present invention.
Figure 9:
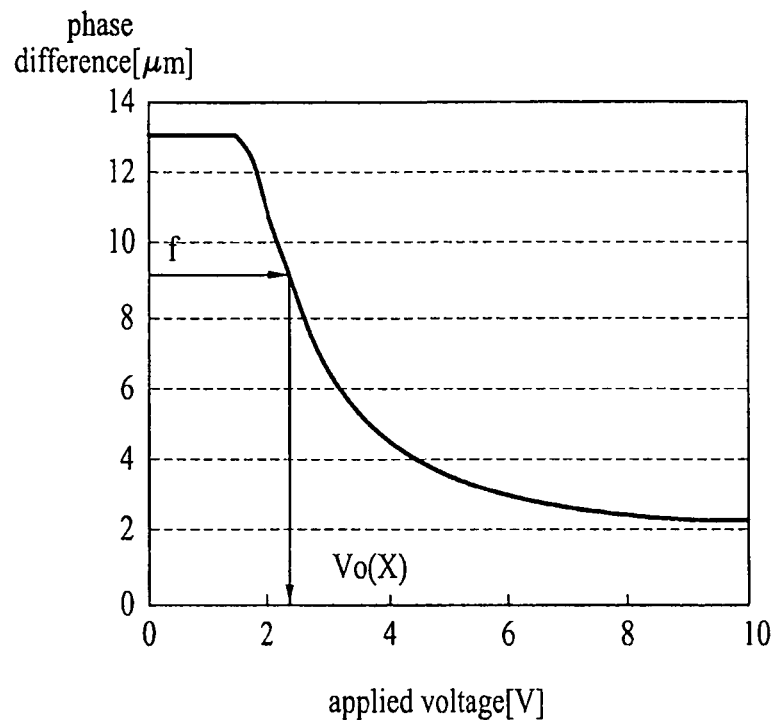
FIG. 9 is a graph illustrating a phase difference depending on voltages applied to the electrically-driven liquid crystal lens according to the present invention and a lens shape based on the phase difference.
Figure 10:
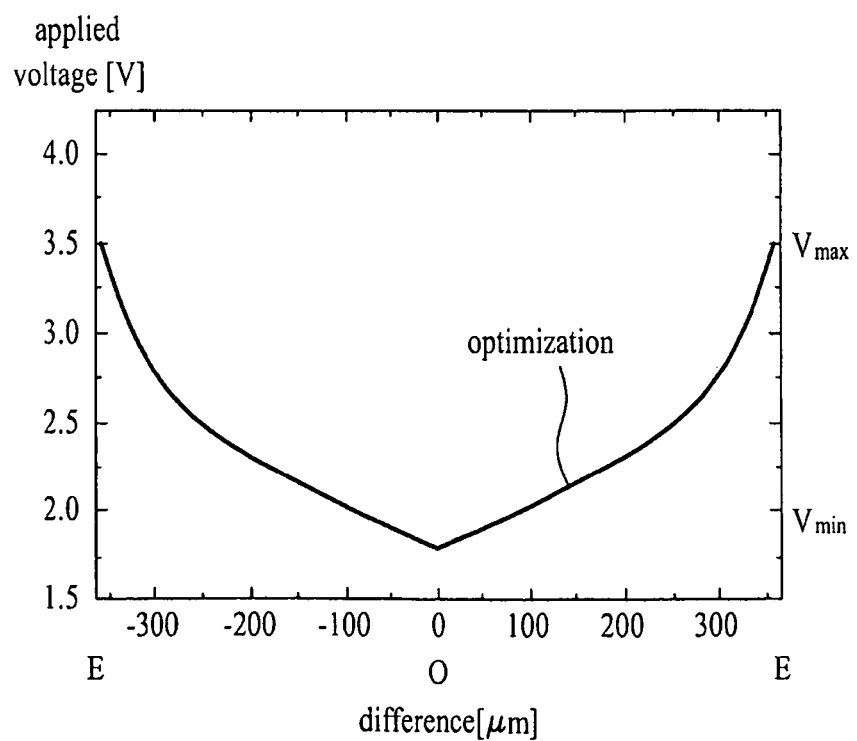
FIG. 10 is a graph illustrating electric potential distribution at different positions of the electrically-driven liquid crystal lens according to the present invention.

FIG. 8 is a block diagram illustrating a voltage application manner according to the present invention. FIG. 9 is a graph illustrating a phase difference depending on voltages applied to the electrically-driven liquid crystal lens according to the present invention and a lens shape based on the phase difference. FIG. 10 is a graph illustrating electric potential distribution at different positions of the electrically-driven liquid crystal lens according to the present invention.

As shown in FIG. 8, to distribute voltage signals between the minimum voltage Vmin and the maximum voltage Vmax, the distribution voltage generator 160, which constitutes the voltage source, includes the resistors R1, R2, . . . , Rn-1 between input terminals of the maximum and minimum voltages Vmax and Vmin and in other words, between the respective voltage signal output terminals, and buffers B1, B2, . . . , Bn to output stabilized voltage signals to the respective voltage signal output terminals so as to allow the voltage signals to be applied from the respective voltage signal output terminals to the metal wirings 110 of the pad region(s) 152 via the links 161.

The voltages to be applied to the first electrodes can be calculated based on definitions as shown in FIGS. 9 and 10. In this case, the respective voltages from the maximum voltage Vmax to the minimum voltage Vmin are produced by the distribution voltage generator 160 (FIG. 8). The distribution voltage generator 160 includes the plurality of resistors R1, R2, . . . Rn-2, Rn-1 provided between the respective voltage output terminals from the maximum voltage Vmax to the minimum voltage Vmin, to distribute the voltages to be applied to the respective first electrodes 110. Nodes are set between the plurality of resistors, and the buffers stabilize voltage signals output from the nodes. In this case, the voltage signals are finally applied to the active region via connection between wirings from the buffers to the voltage source and the metal wirings of the pad region(s).

Current, passing through the distribution voltage generator, is set to a value of several mAs. Here, if the current is too small, excessive drive voltage fluctuation is encountered, causing an unstable voltage level to be output to each node. On the contrary, if the current is too large, the resistors within the distribution voltage generator may overheat, wasting electricity. Accordingly, it is preferred to determine a desired current value by increasing or decreasing the drive voltage fluctuation and the heat-waste electric-power.

Voltage signals Vmin, V1, . . . , Vmax output from the distribution voltage generator 160 are applied to the metal wirings 110 of the pad regions 152 through the links 161, and the metal wirings 110 come into contact with the ends of the respective first electrodes 101. In this case, the number of the voltage signals output from the distribution voltage generator 160 is equal to the number of the first electrodes 101 located between the edge E and the center O of each lens region L. Also, the voltage signals, which are output from the distribution voltage generator 160 so as to be applied to the first electrodes 110 between the center O and the edge E of each lens region L, take the form of a secondary function about the center O or the edge E as shown in FIG. 10.

Now, selection of the appropriate voltage to be applied will be described. For example, as shown in FIG. 9, assuming that a desired value of voltage is given, and on the basis of a Table according to a phase difference of a liquid crystal layer, an electrically-driven liquid crystal lens is simulated according to the relationship of the voltage and the phase difference. When the simulated electrically-driven liquid crystal lens has a shape similar to a desired lens shape, the corresponding Table is selected and voltage values per different positions of electrodes in a lens region are calculated from the Table.

As shown in FIG. 9, the electrically-driven liquid crystal lens according to the present invention must be configured such that voltages applied to the plurality of first electrodes are gradually decreased from the edge to the center of the lens region, in order to enable formation of a lens having a parabolic lens surface as shown in FIG. 7. Specifically, in FIG. 9, a low voltage must be applied to a region (i.e. the center of the lens region) having a large phase difference (in the graph illustrating the shape of a lens, the ordinate represents the phase difference). Also, a high voltage must be applied to a region (i.e. the edge of the lens region) having a small phase difference. That is, the applied voltage is inversely proportional to the phase difference.

As shown in FIG. 10, the applied voltages are decreased from the maximum voltage Vmax to the minimum voltage Vmin toward the center of the lens region with increasing distance from the edge of the lens region. In this case, with respect to a single lens region, regions from the center of the lens region to the left and right edges of the lens region are symmetrical to each other. Specifically, assuming the center of the lens region is set to a zero point and the left and right regions from the center to the left and right edges of the lens region have the relationship of (−) and (+)-axes, respectively, the applied voltages are defined as values proportional to the square of different distances x from the center.

Figure 11:
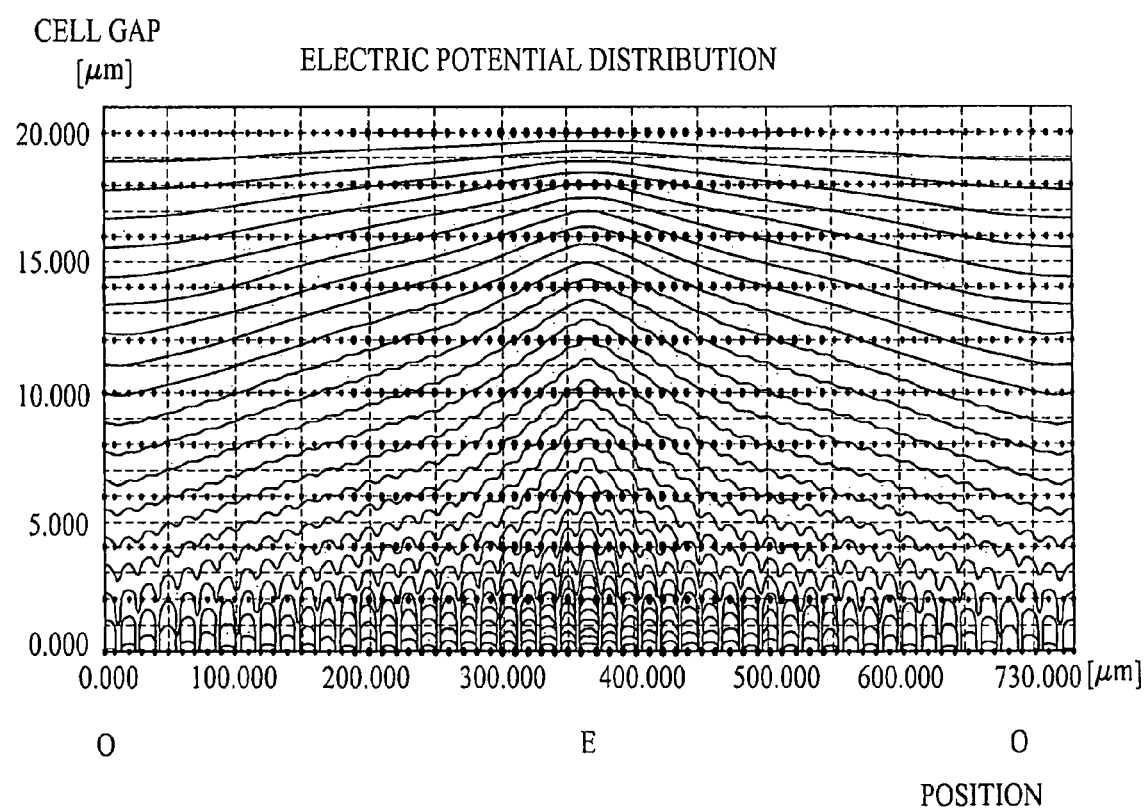
FIG. 11 is a simulation diagram according to the first embodiment of the present invention.
Figure 12:
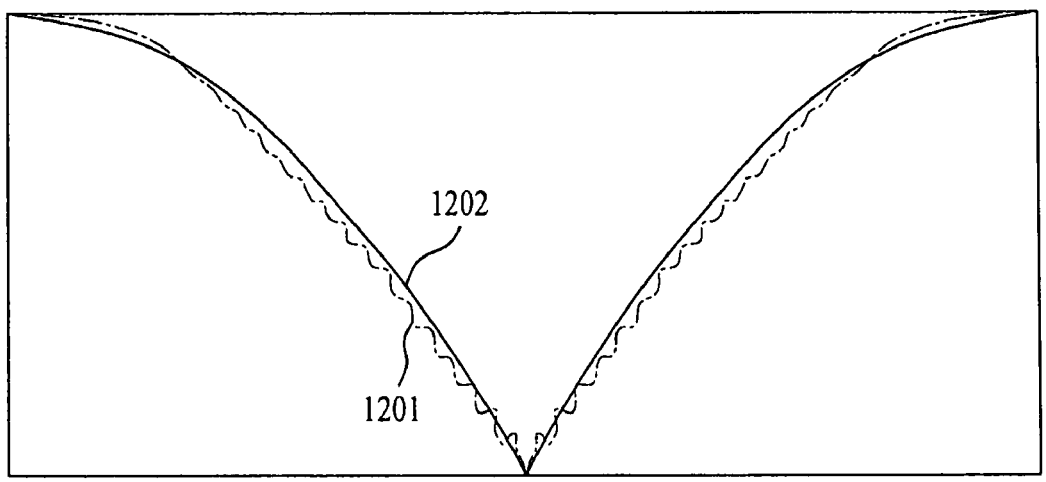
FIG. 12 is a view illustrating the lens shape of the electrically-driven liquid crystal lens according to the first embodiment of the present invention.

FIG. 11 is a simulation diagram according to the first embodiment of the present invention, and FIG. 12 is a view illustrating the lens shape of the electrically-driven liquid crystal lens according to the first embodiment of the present invention.

FIG. 11 illustrates electric potential distribution of the above-described electrically-driven liquid crystal lens according to the first embodiment of the present invention. In the simulation, the liquid crystal layer 300 had a thickness of 20.000 μm, and liquid crystals of the liquid crystal layer 300 had a positive dielectric constant anisotropy.

Specifically, in the graph of FIG. 11, the lowermost coordinate point 0.000 μm of the ordinate representing a cell gap of the liquid crystal layer 300 can be referred to as a surface of the first alignment film 102 on the first substrate 100, and the uppermost coordinate point 20.000 μm can be referred to as a surface of the second alignment film 202 on the second substrate 200. As the first electrodes, all of which have the same width, are arranged on the same substrate and different voltages gradually decreasing from the edge to the center of the lens region are applied to the first electrodes, as shown in FIG. 11, a generally gentle vertical electric field is generated, and also, a horizontal electric field is slightly generated between the neighboring first electrodes. In conclusion, a gentle side electric field, which is strong at the edge E of the lens region (the center of the drawing) and is weak at the center O of the lens region, can be observed. Accordingly, as shown in FIG. 12 representing an optical path of liquid crystals aligned according to an electric field of different positions, it can be appreciated that the electrically-driven liquid crystal lens has a lens shape (shown by a line 1201) similar to a gentle parabolic lens surface (shown by a line 1202) in which the edge E of the lens region represents the shortest optical path and the center O of the lens region represents the longest optical path. In this case, as the electrically-driven liquid crystal lens includes a plurality of fine electrodes per lens region and different voltages are applied to the electrodes, a fine waveform lens surface can be accomplished rather than a completely smooth lens surface. In this way, a lens profile substantially similar to a parabolic lens surface can be accomplished.

In FIG. 11, the cell gap of the liquid crystal layer 300 is 20.000 μm. Provision of the above-described fine first electrodes has the effect of lowering a sag (a highest point of the lens) of the electrically-driven liquid crystal lens and thus, the thickness (cell gap) of the liquid crystal layer 300 constituting the electrically-driven liquid crystal lens can be reduced. Specifically, in the case of the conventional electrically-driven liquid crystal lens in which a limited number of electrodes are formed only at the edge of the lens region on a lower substrate, the liquid crystal layer must have a cell gap (thickness) of about 50.000 μm or more to achieve the same sag as the simulation graph of FIG. 11. However, the present invention can reduce the thickness of the liquid crystal layer via gentle electric field distribution within the lens region.

In addition, in the case where a plurality of views is provided in each lens region via provision of the first electrodes 101 of the above described fine pattern, it can be appreciated that the electrically-driven liquid crystal lens of the present invention has advantages over the conventional electrically-driven liquid crystal lens. As compared to the conventional electrically-driven liquid crystal lens in which an electric field is weak at the center of a lens region of a lower substrate having no electrode due to an increased pitch, resulting in a difficulty in alignment adjustment of liquid crystals, in the electrically-driven liquid crystal lens of the present invention an electric field intensity at a given position is easily adjusted.

Figure 13:
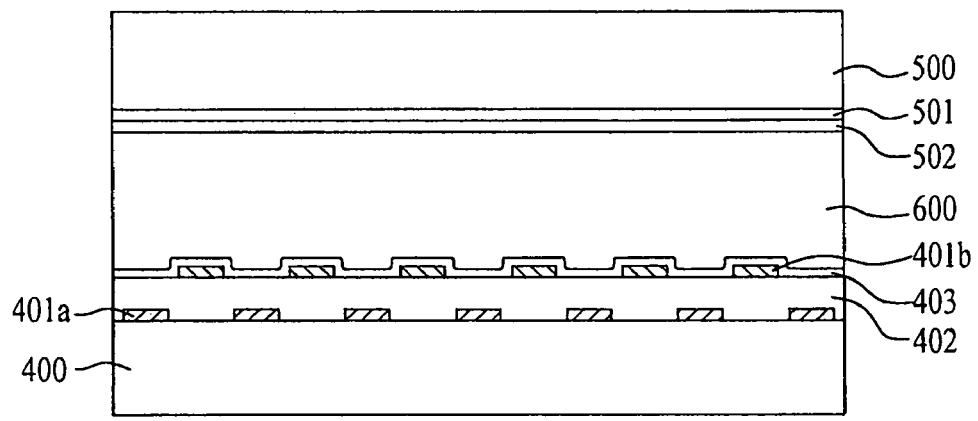
FIG. 13 is a sectional view illustrating an electrically-driven liquid crystal lens according to a second embodiment of the present invention.
Figure 14:
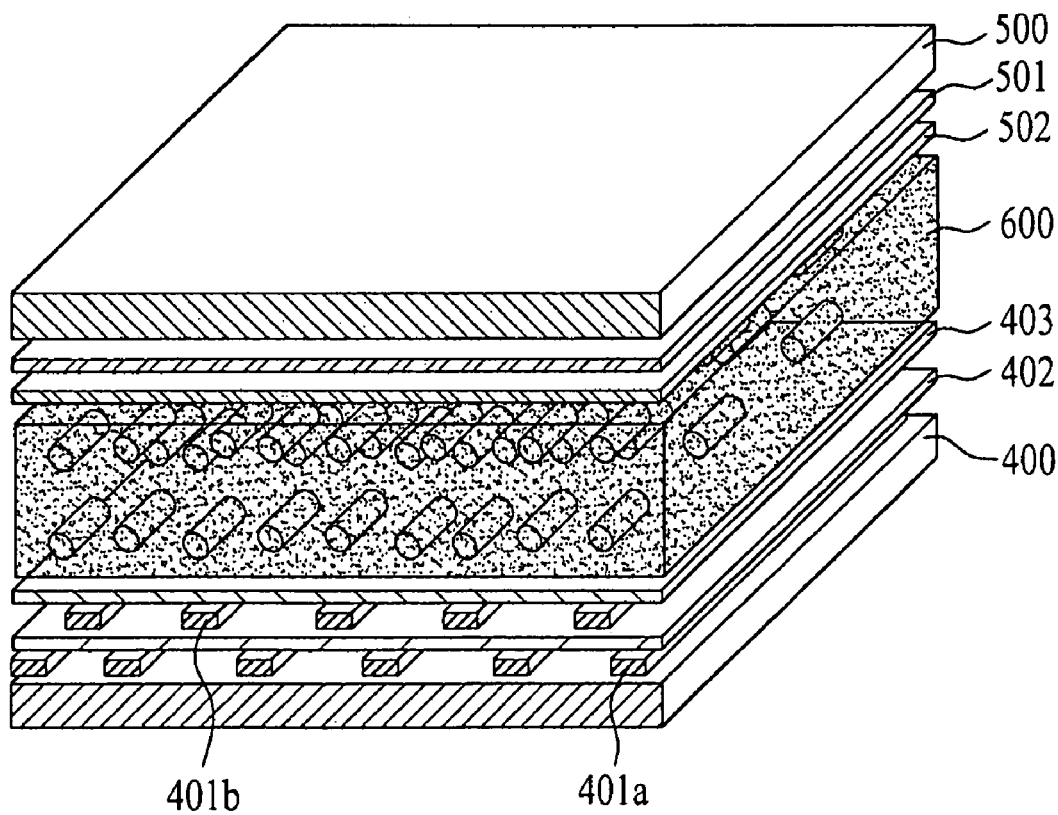
FIG. 14 is an exploded perspective view of FIG. 13.

FIG. 13 is a sectional view illustrating an electrically-driven liquid crystal lens according to a second embodiment of the present invention. FIG. 14 is an exploded perspective view of FIG. 13.

As shown in FIGS. 13 and 14, at least one insulating film may be further formed on a first substrate 400.

More specifically, as shown in FIGS. 13 and 14, the electrically-driven liquid crystal lens according to the second embodiment of the present invention includes a plurality of first electrodes 401a and 401b, which are formed on different layers. This embodiment is applicable to situations in which a large number of first electrodes is required according to a pitch of lens regions and it is difficult to arrange the first electrodes on a single layer with a desired spacing distance. Accordingly, by providing one or more insulating films 402 over the first substrate 400, the first electrodes 401a and 401b can be distributed on the insulating films 402. Here, the plurality of first electrodes 401a and 401b are arranged on the first substrate 400 or on the plurality of insulating films 402 in such a way that they are horizontally symmetrically arranged about the edge E of each lens region.

Reference numeral 403 represents a first alignment film, reference numeral 500 represents a second substrate, and reference numerals 501 and 502 represent a second electrode and a second alignment film, respectively. Also, reference numeral 600 represents a liquid crystal layer. These constituent elements have the same function as the above-described first embodiment, and a description thereof will be omitted.

With the present embodiment in which the plurality of insulating films 402 is formed and the first electrodes are formed on the first substrate 400 and the insulating films 402, when the configuration of the electrodes is finally viewed from the upper side as a plan view, all the first electrodes within each lens region can be arranged to completely fill the active region of the first substrate 400, making it easy to achieve a stable profile of the electrically-driven liquid crystal lens.

In FIGS. 13 and 14, the first electrodes 401b on the plurality of insulating films 402 are positioned to correspond to locations on the first substrate 401 where the plurality of first electrodes 401 are not formed.

Figure 15:
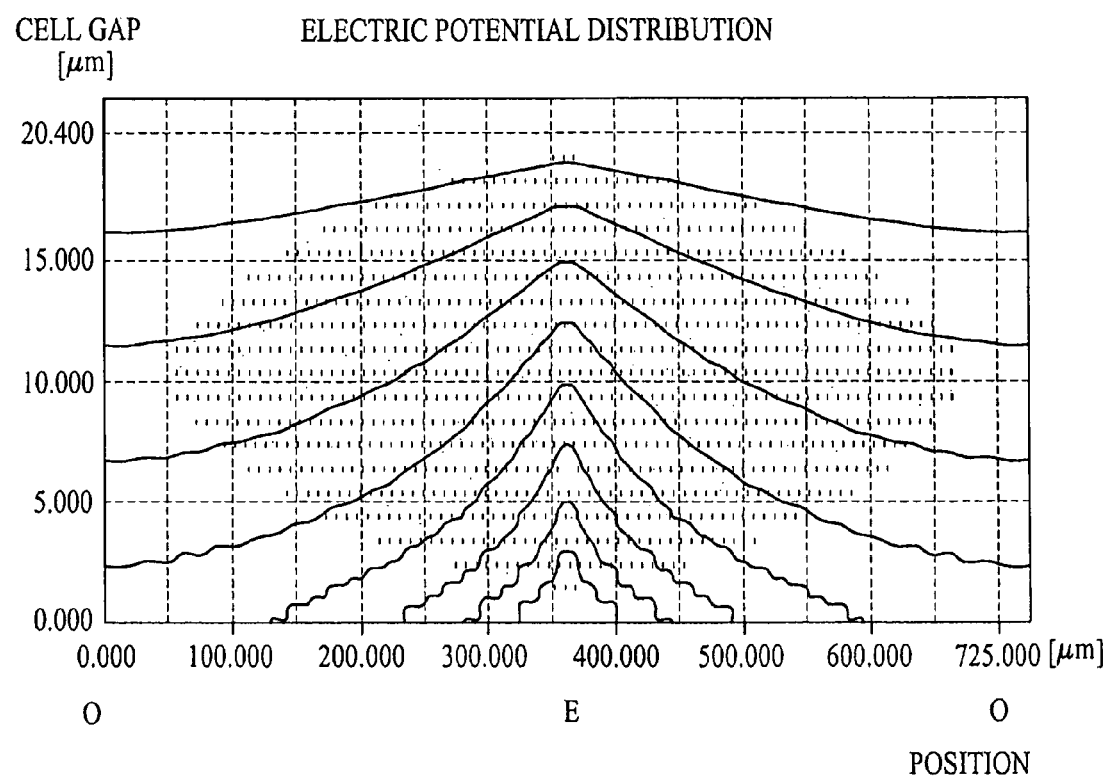
FIG. 15 is a simulation diagram according to the second embodiment of the present invention.
Figure 16:
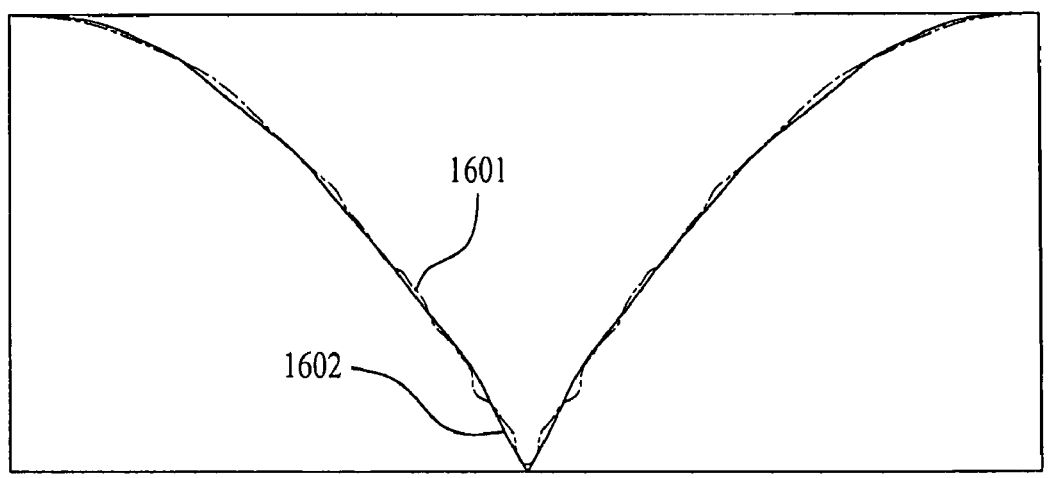
FIG. 16 is a sectional view illustrating the electrically-driven liquid crystal lens according to the second embodiment of the present invention.

FIG. 15 is a simulation diagram according to the second embodiment of the present invention. FIG. 16 is a sectional view illustrating the electrically-driven liquid crystal lens according to the second embodiment of the present invention.

FIG. 15 illustrates electric potential distribution of the above-described electrically-driven liquid crystal lens according to the second embodiment of the present invention. In the simulation, the liquid crystal layer 600 had a thickness of 20.000 μm, and liquid crystals of the liquid crystal layer 600 had a positive dielectric constant anisotropy.

Specifically, in the graph of FIG. 15, the lowermost coordinate point 0.000 μm of the ordinate representing a cell gap of the liquid crystal layer 300 can be referred to as a surface of the first alignment film 402 on the first substrate 400, and the uppermost coordinate poin t 20.000 μm can be referred to as a surface of the second alignment film 502 on the second substrate 500. As the first electrodes 401a and 401b, all of which have the same width, are arranged on the same substrate and different voltages gradually decreasing from the edge to the center of the lens region are applied to the first electrodes 401a and 401b, as shown in FIG. 15, a generally gentle vertical electric field is generated, and also, a horizontal electric field is slightly generated between the neighboring first electrodes. In conclusion, a gentle side electric field, which is strong at the edge E of the lens region (the center of the drawing) and is weak at the center O of the lens region, can be observed. Accordingly, as shown in FIG. 16 representing an optical path of liquid crystals aligned according to an electric field of different positions, it can be appreciated that the electrically-driven liquid crystal lens has a lens shape similar to a gentle parabolic lens surface in which the edge E of the lens region represents the shortest optical path and the center O of the lens region represents the longest optical path. In this case, as the electrically-driven liquid crystal lens includes a plurality of fine electrodes per lens region and different voltages are applied to the electrodes, a fine waveform lens surface can be accomplished rather than a completely smooth lens surface. In this way, a lens profile substantially similar to a parabolic lens surface can be accomplished.

Now, the second embodiment shown in FIGS. 15 and 16 will be described in detail as compared with the first embodiment shown in FIGS. 11 and 12. In the second embodiment in which the first electrodes are arranged on two different layers, as shown in FIG. 15, the liquid crystal layer 600 has a smooth electric potential distribution without fine waves caused at the edge of the lens region. Referring to FIG. 16, the resulting electrically-driven liquid crystal lens 100 has a lens surface (shown by a line 1601) substantially similar to a parabolic lens surface (shown by a line 1602) and shows substantially no distortion even at the edge of the lens region.

In conclusion, in the case where a plurality of fine electrodes is provided per lens region on the above-described two or more layers and a total width of the plurality of electrodes is determined to completely fill the entire active region when viewed in a plan view, the electrically-driven liquid crystal lens can achieve a further improved smooth lens profile and also, can achieve a further reduction in cell gap by virtue of enhanced electric field effects. The reduced minimum cell gap required to form the liquid crystal layer can result in a reduction in the amount of liquid crystals constituting the liquid crystal layer.

Meanwhile, in the same manner as the above-described first embodiment, the electrically-driven liquid crystal lens according to the second embodiment further adopts the pad regions and the voltage distribution function, to enable application of first to $n^{th}$ voltage signals Vmin to Vmax.

As apparent from the above description, an electrically-driven liquid crystal lens and a stereoscopic display device using the same according to the present invention has the following effects.

Firstly, in the case of a conventional electrically-driven liquid crystal lens, since electrodes are formed only on a partial region of a lower substrate, side electric field effects resulting from a vertical electric field of the electrodes become weaker with increasing distance from each electrode, making it difficult to adjust alignment of liquid crystals at a region distant from the electrode, i.e. at the center of the lens region. However, the electrically-driven liquid crystal lens of the present invention is configured in such a way that electrodes are formed throughout the lens region by a constant interval and different voltages are applied to the respective examples such that, for example, the highest voltage is applied to the edge of the lens region and the voltages are gradually decreased toward the center of the lens region. With this configuration and voltage application, the electrically-driven liquid crystal lens can achieve a gentle and smooth parabolic lens surface within the lens region.

Secondly, with formation of the electrically-driven liquid crystal lens having a gentle parabolic lens surface, a liquid crystal layer of the lens can achieve a reduced cell gap. This can reduce time and processes required to form the liquid crystal layer, resulting in a reduction in manufacturing costs of the electrically-driven liquid crystal lens.

Thirdly, in the electrically-driven liquid crystal lens of the present invention, the plurality of electrodes may be arranged on a single layer or on a plurality of insulating layers (including the substrate) within a single lens region such that the liquid crystal layer can be driven as voltages are applied to the respective electrodes. In conclusion, since the electrodes are arranged throughout the lens region, it is possible to solve a problem in that an electric field shows different intensities according to a given position. As a result, even in the case of a large-area display devices a gentle electric field required to drive the liquid crystal layer can be accomplished, enabling formation of the electrically-driven liquid crystal lens having a gentle parabolic lens surface.

Fourthly, as a result of arranging the plurality of fine electrodes on two or more layers per lens region such that the fine electrodes of the plurality of layers have a width sufficient to fill the entire active region when viewed in a plan view, the electrically-driven liquid crystal lens can achieve a further improved smooth profile and consequently, a further reduced call gap by virtue of enhanced electric field effects. In conclusion, the reduced minimum cell gap required to form the liquid crystal layer has the effect of reducing the amount of liquid crystals of the liquid crystal layer.

Fifthly, in addition to the plurality of electrodes, the electrically-driven liquid crystal lens further includes a distribution voltage generator, which includes a plurality of resistors and buffers are further provided between voltage output terminals of the preset minimum and maximum voltages, to distribute different voltages, applied to the minimum and maximum voltage input terminals, into a plurality of voltage values. Provision of the distribution voltage generator enables generation of different voltage values to be applied to the fine electrodes.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An electrically-driven liquid crystal lens comprising:
   first and second substrates arranged opposite each other and including an active region having a plurality of lens regions and a non-display region at an outer rim of the active region, wherein the non-display region has a seal pattern to enclose the active region between the first and second substrates, and a pad region at both sides of the first substrate;
   a plurality of first electrodes formed on the first substrate to correspond to each lens region of the plurality of lens regions and spaced apart from one another, wherein the plurality of first electrodes take the form of bars extending along a crosswire direction of the first substrate, and the plurality of first electrodes have a same width;
   a second electrode formed on an entire surface of the second substrate;
   a voltage source configured to apply gradually decreasing voltages to the plurality of first electrodes from both edges to a center of each lens region, respectively, and to apply a ground voltage to the second electrode, wherein the gradually decreasing voltages applied to the plurality of first electrodes are greater than the ground voltage; and
   a liquid crystal layer interposed between the first substrate and the second substrate.

2. The electrically-driven liquid crystal lens according to claim 1, wherein the plurality of first electrodes are spaced apart from one another by the same spacing distance.

3. The electrically-driven liquid crystal lens according to claim 2, wherein the width of the plurality of first electrodes and the spacing distance between the neighboring first electrodes are in a range of 2 μm to 10 μm.

4. The electrically-driven liquid crystal lens according to claim 1, wherein the plurality of first electrodes are formed on the same layer over the first substrate.

5. The electrically-driven liquid crystal lens according to claim 1, further comprising at least one insulating film on the first substrate.

6. The electrically-driven liquid crystal lens according to claim 5, wherein the plurality of first electrodes are formed on the first substrate and on the insulating film such that the plurality of first electrodes are horizontally symmetrical in each lens region of the first substrate.

7. The electrically-driven liquid crystal lens according to claim 6, wherein the plurality of first electrodes on the insulating film are positioned to correspond to locations where no first electrode is formed on the first substrate.

8. The electrically-driven liquid crystal lens according to claim 1, wherein the voltage source includes a distribution voltage generator, which distributes a plurality of different voltages between a minimum voltage and a maximum voltage, so as to apply different voltages to the respective first electrodes.

9. The electrically-driven liquid crystal lens according to claim 8, wherein the pad region further includes metal wirings, to which voltage signals output from the distribution voltage generator are applied, and the metal wirings come into contact with ends of the first electrodes.

10. The electrically-driven liquid crystal lens according to claim 8, wherein the number of the voltage signals output from the distribution voltage generator is equal to the number of the plurality of first electrodes located between the edge and the center of each lens region.

11. The electrically-driven liquid crystal lens according to claim 10, wherein the voltage signals output from the distribution voltage generator between the center and the edge of each lens region correspond to a secondary function.

12. The electrically-driven liquid crystal lens according to claim 8, wherein the distribution voltage generator includes, to distribute voltage signals between maximum and minimum voltages, resistors between maximum and minimum voltage input terminals and between voltage signal output terminals of the respective voltage signals, and buffers between the respective voltage signal output terminals and the metal wirings of the pad region.

13. The electrically-driven liquid crystal lens according to claim 1, further comprising:
   a first alignment film formed on the first substrate including the plurality of first electrodes; and
   a second alignment film formed on the second electrode.

14. The electrically-driven liquid crystal lens according to claim 13, wherein the first alignment film has the same rubbing direction as a longitudinal direction of the plurality of first electrodes, and the second alignment film has a rubbing direction intersecting that of the first alignment film.

15. The electrically-driven liquid crystal lens according to claim 1, wherein the first and second electrodes are made of transparent metals.

16. A stereoscopic display device comprising:
an electrically-driven liquid crystal lens including:
- first and second substrates arranged opposite each other and including an active region having a plurality of lens regions and a non-display region at an outer rim of the active region, wherein the non-display region has a seal pattern to enclose the active region between the first and second substrates, and a pad region at both sides of the first substrate;
- a plurality of first electrodes formed on the first substrate to correspond to each lens region of the plurality of lens regions and spaced apart from one another, wherein the plurality of first electrodes take a form of bars extending along a crosswire direction of the first substrate, and the plurality of first electrodes have a same width;
- a second electrode formed on the entire surface of the second substrate;
- a voltage source configured to apply gradually decreasing voltages to the plurality of first electrodes from both edges to a center of each lens region, respectively, and to apply a ground voltage to the second electrode, wherein the gradually decreasing voltages applied to the first electrodes are greater than the ground voltage; and
- a liquid crystal layer interposed between the first and second substrates; and
a display panel provided below the electrically-driven liquid crystal lens, and configured to transmit a 2-dimensional image signal to the electrically-driven liquid crystal lens.

* * * * *

UNITED STATES PATENT AND TRADEMARK OFFICE
CERTIFICATE OF CORRECTION

PATENT NO. : 8,305,550 B2  
APPLICATION NO. : 12/169952  
DATED : November 6, 2012  
INVENTOR(S) : Sung Min Jung et al.

Page 1 of 1

It is certified that error appears in the above-identified patent and that said Letters Patent is hereby corrected as shown below:

ON THE TITLE PAGE and IN THE SPECIFICATION:

At item (54) on the Title Page and at column 1, lines 1-3, of the Specification, correct the title to read as follows:

--ELECTRICALLY-DRIVEN LIQUID CRYSTAL LENS AND STEREOSCOPIC DISPLAY DEVICE USING THE SAME--.

Signed and Sealed this  
Second Day of April, 2013

Teresa Stanek Rea  
*Acting Director of the United States Patent and Trademark Office*